United States Patent [19]
Mowatt et al.

[11] Patent Number: 5,352,161

[45] Date of Patent: Oct. 4, 1994

[54] CAPACITY CONTROL FOR NESTED CLUTCH AUTOMATIC TRANSMISSION

[75] Inventors: Joel E. Mowatt, Zionsville; Charles F. Long, Pittsboro; Phillip F. McCauley, Zionsville, all of Ind.

[73] Assignee: General Motors Corporation, Detroit, Mich.

[21] Appl. No.: 47,587

[22] Filed: Apr. 13, 1993

[51] Int. Cl.⁵ ............................................. F16D 25/11
[52] U.S. Cl. .................................. 475/123; 192/87.13
[58] Field of Search ..................... 74/867; 475/123; 192/87.13, 87.1, 87.11

[56] References Cited

U.S. PATENT DOCUMENTS

| | | | |
|---|---|---|---|
| 3,699,994 | 10/1972 | Mohri | 74/867 |
| 3,747,730 | 7/1973 | Hause | 192/87.11 |
| 5,070,747 | 12/1991 | Lentz et al. | 74/867 |
| 5,230,411 | 7/1993 | Nishida et al. | 192/87.11 |

Primary Examiner—Edward K. Look
Assistant Examiner—James A. Larson
Attorney, Agent, or Firm—Donald F. Scherer

[57] ABSTRACT

A method and apparatus for increased clutch capacity in an automatic vehicle transmission having a nested clutch pair. An electronic control unit controls a pulse width modulator which applies control signals to the actuating solenoid valves of the nested pair of clutches. The electronic control unit operates to reduce the pressure on an engaged clutch of the pair during the period of time that the other clutch is being actuated during the shift. Once the shift is completed, the operating pressure on the previously engaged clutch is restored to a normal operating pressure. Provisions are also made for assuring that the period of time required for the shift is maintained between threshold limits or within a window of time. This adaptive feature precludes excessively short or long shifts.

3 Claims, 2 Drawing Sheets

| RANGE | | CLUTCHES APPLIED | | | | |
|---|---|---|---|---|---|---|
| | | C1 | C2 | C3 | C4 | C5 |
| FWD | 1 | X | | | | X |
| | 2 | X | | | X | |
| | 3 | X | | X | | |
| | 4 | X | X | | | |
| | 5 | | X | X | | |
| | 6 | | X | | X | |
| REV | 1 | | | X | | X |

CAPACITY CONTROL FOR NESTED CLUTCH AUTOMATIC TRANSMISSION

TECHNICAL FIELD

The invention herein resides in the art of power transmission devices and, more particularly, to automatic transmissions for vehicles. Specifically, the invention relates to an apparatus and technique which provides for increased clutch capacity when the clutch arrangement is such that the engagement of one clutch lowers the capacity of another.

BACKGROUND ART

It is well known that automatic transmissions for vehicles comprise a plurality of clutches. As a transmission shifts through its various "gears" or "ranges," associated clutches are engaged and disengaged. In most transmissions, the clutches are independent of each other such that the prior engagement of one clutch does not impact the engagement of another. However, in some transmissions the engagement of one clutch lowers the capacity of another. For example, gear schemes of transmissions such as those shown in U.S. Pat. No. 4,070,927 are such that the operation of engaging one of the clutches is impacted by the prior engagement of another. Specifically, in such prior art patent the C1 clutch is nested in the C2 clutch. Accordingly, when the C1 clutch is engaged, the force available to apply the C2 clutch is reduced according to the formula:

$$C2\ force = (C2\ pressure)(C2\ piston\ area) - (C1\ pressure)(C1\ piston\ area).$$

As a consequence, any transmission shift requiring application of the C2 clutch while the C1 piston cavity is pressurized is characterized by limited C2 clutch capacity.

In transmissions such as those taught by U.S. Pat. No. 4,070,927, the 3–4 range shift of the transmission is the weak link in the overall transmission torque capacity because clutch C2 is brought into engagement at a time that clutch C1 is already engaged.

There is a need in the art for an apparatus and technique which allows for improved clutch capacity control for nested clutch automatic transmission to assure sufficient capacity for the oncoming clutch to optimize the oncoming shift. Further, the art requires an apparatus and technique which provides such an improved clutch capacity control in a nested clutch automatic transmission which is adaptive, maintaining the length of the shift within a defined range.

DISCLOSURE OF INVENTION

In light of the foregoing, it is a first aspect of the invention to provide an apparatus and technique for improving shifts in automatic transmissions which ensure sufficient capacity in an oncoming clutch in a nested clutch automatic transmission to optimize the oncoming shift.

Another aspect of the invention is the provision of an apparatus and technique for improving shifts in automatic transmissions which reduce the pressure of an engaged clutch to maximize the available pressure to the oncoming clutch in a nested clutch pair.

Yet another aspect of the invention is the provision of an apparatus and technique for improving shifts in automatic transmissions which reduces main supply pressure to the clutches of a nested pair during a period of engaging one of the pair while the other is already engaged.

Still a further aspect of the invention is the provision of an apparatus and technique for improving shifts in automatic transmissions which regulates the available pressure to clutches of a nested pair, while also providing an adaptive feature to maintain the time required to effect a shift within set limits.

It is still another aspect of the invention to provide an apparatus and technique for improving shifts in automatic transmissions which increases overall rated torque capacity allowing for the use of higher performance engines.

Yet another aspect of the invention is the provision of an apparatus and technique for improving shifts in automatic transmissions which allows the implementation of increasingly compact clutches and gear arrangements due to a smaller C2 clutch, thereby reducing costs and complexity, improving fuel economy, and reducing the required vehicle space.

The foregoing and other aspects of the invention which will become apparent as the detailed description proceeds are achieved by an automatic transmission for a vehicle, comprising: a plurality of clutches, including at least a pair of first and second such clutches being nested together; and means interconnecting said plurality of clutches for engaging and disengaging selected ones of said clutches to attain desired transmission ranges, said means reducing a pressure to said first clutch to keep said first clutch engaged while applying a pressure to said second clutch to attain engagement of said second clutch while said first clutch is engaged.

Other aspects of the invention which will become apparent herein are achieved by the improvement in an automatic transmission for a vehicle having a plurality of clutches adapted for selective engagement to achieve transmission operation in selected ranges, and wherein at least a pair of first and second of said clutches are nested together, such improvement being of a clutch control mechanism, comprising: electric control means interconnecting said clutches for reducing a pressure on said first clutch to a first level and applying a pressure to said second clutch at a second level when said second clutch is being engaged while said first clutch is already engaged to achieve a transmission shift, and further monitoring a period of time to complete said shift and thence adjusting said first and second levels to attain said shift between upper and lower thresholds of time.

Yet additional aspects of the invention are attained by an automatic transmission for vehicles, comprising: a plurality of clutches; first and second clutches of said plurality of clutches being nested together such that a force available to engage said second clutch is restricted by a present engagement of said first clutch; and control means interconnecting said clutches for controlling the engagement thereof to attain selected transmission ranges, said control means reducing a force applied to said first clutch to a first level to keep said first clutch engaged while applying a force of a second level to said second clutch to attain engagement of said second clutch to attain a transmission shift, and thence increasing said forces applied to said first and second clutches following engagement of said second clutch, said control means further monitoring a period of time to complete said transmission shift and modifying said first and second levels to attain said transmission shift within fixed limits of time.

DESCRIPTION OF DRAWINGS

For a complete understanding of the objects, techniques, and structure of the invention, reference should be made to the following detailed description and accompanying drawings wherein.

BEST MODE FOR CARRYING OUT THE INVENTION

Figures 1, 2:
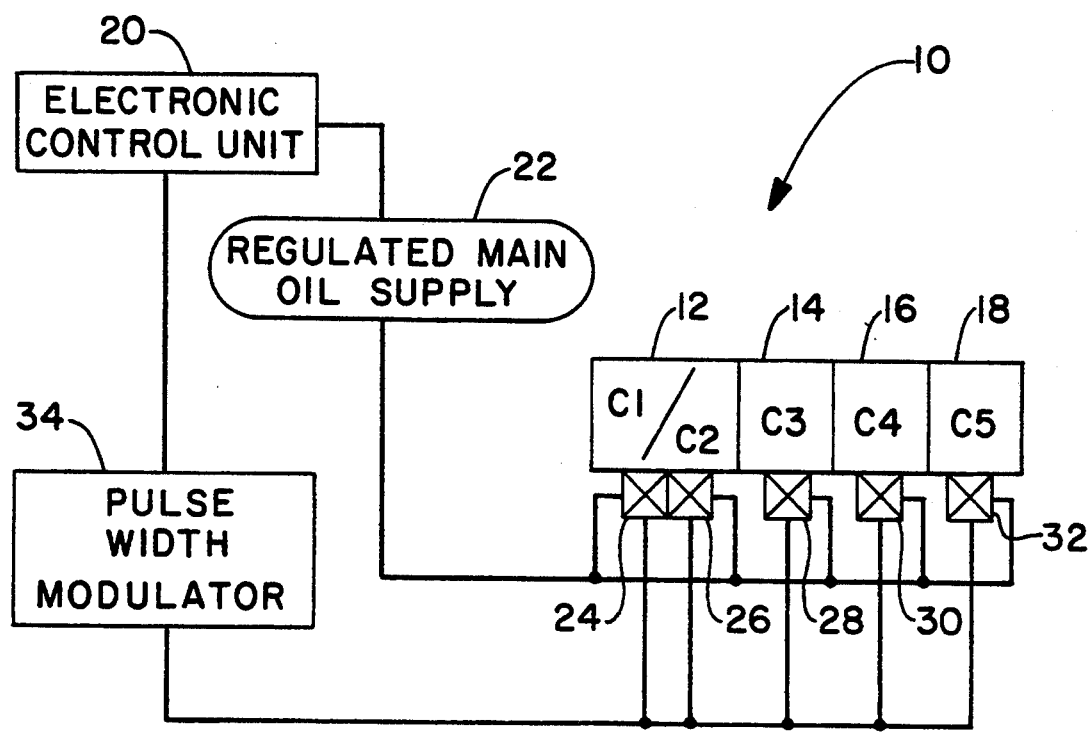
FIG. 1 is a schematic diagram of an automatic transmission according to the invention.
FIG. 2 is a gearshift chart for the transmission of FIG. 1.

Referring now to the drawings and more particularly FIG. 1, it can be seen that an automatic vehicle transmission according to the invention is designated generally by the numeral 10. As is well known and understood by those skilled in the art, the automatic transmission 10 comprises a plurality of clutches. In the specific embodiment shown, clutches C1 and C2 comprise a nested clutch pair 12, while separate and independent clutches C3, C4, and C5 are designated respectively by the numerals 14, 16, 18.

An electronic control unit 20 is provided for regulating the operation of the automatic vehicle transmission 10 in a manner well known and understood by those skilled in the art. It will be appreciated that the electronic control unit 20 comprises a dedicated microprocessor which serves to monitor the operation of the transmission 10, provide adaptive features, monitor transmission oil temperature and levels, and to achieve smooth and efficient operation of the transmission in general. A pressure regulated main supply of transmission oil 22 is applied to the cavities of the clutches C1-C5 by means of respectively associated solenoid valves 24-32, as shown. Regulation of the pressure on the main supply of transmission oil 22 is under the control of the electronic control unit 20. A pulse width modulator 34, also controlled by the electronic control unit 20 interconnects with the solenoid valves 24-32 to apply actuating signals to such solenoid valves at a duty cycle determined by the electronic control unit. Those skilled in the art will readily appreciate that the amount of pressure applied to the various clutches C1-C5 is controlled through the electronic control unit 20 and the pulse width modulator 34 by means of regulating the appropriate control signals applied to the solenoid valves 24-32.

With reference now to FIG. 2, those skilled in the art will be able to readily perceive the operation of the automatic vehicle transmission 10 through its various "gears" or "ranges". The transmission 10 is capable of six forward ranges and one reverse range, each such range requiring the engagement of two of the clutches C1-C5. For example, range 1 requires engagement of clutches C1 and C5, range two requires engagement of clutches C1 and C4, range three requires the engagement of clutches C1 and C3, range four requires the engagement of clutches C1 and C2, range five requires the engagement of clutches C2 and C3, and range six requires the engagement of clutches C2 and C4. The single range for reverse is attained from concurrent engagement of clutches C3 and C5.

It will be appreciated from FIG. 2 that the shift going from range three to range four requires the operation of engaging clutch C2 while clutch C1 is already engaged. However, since the C1 clutch is nested within the C2 clutch, when the C1 clutch is applied, the force available to apply the C2 clutch is reduced according to the formula presented above. In other words, the C2 capacity is limited during the 3-4 shift due to the C2 clutch application with the C1 piston cavity pressurized. This shift tends to be the weak link in terms of overall transmission torque capacity.

It will be appreciated that both the C1 and C2 clutch pressures are fully adjustable due to the individual clutch apply solenoids 24, 26 respectively associated therewith. It has been found that by modulating the C1 clutch pressure by means of the pulse width modulator 34 and solenoid valve 24 to a level lower than that of the main supply 22 during the period that the C2 clutch is being engaged, torque capacity can be greatly enhanced. Alternatively, the main supply pressure from the source 22 may be reduced rather than the C1 pressure itself. Such an approach requires a solenoid modulating pressure to a knock down on the main regulator.

Irrespective of the approach taken, once the C2 clutch slip is reduced to zero, indicating that the C2 clutch has been fully applied, the C1 clutch, or alternatively the main supply pressure, can again be elevated to normal levels. This approach can be taken because the C2 clutch frictional coefficient increases greatly in a static as compared to a dynamic condition. Indeed, a typical static to dynamic coefficient of friction ratio of automatic transmission clutch materials is on the order of 1.6. Consequently, a greater pressure or force is required to engage the clutch C2 than to maintain the engagement of the clutch. Of course, the same is true for C1. As a result, the pressure or force applied to C1 can be reduced while maintaining engagement of that clutch, to provide a greater pressure or force to the clutch C2 during the period of time that it is being engaged. Consequently, the 3-4 shift is enhanced by adjusting the relative pressures available to the C1 and C2 clutches during the shift.

Figure 3:
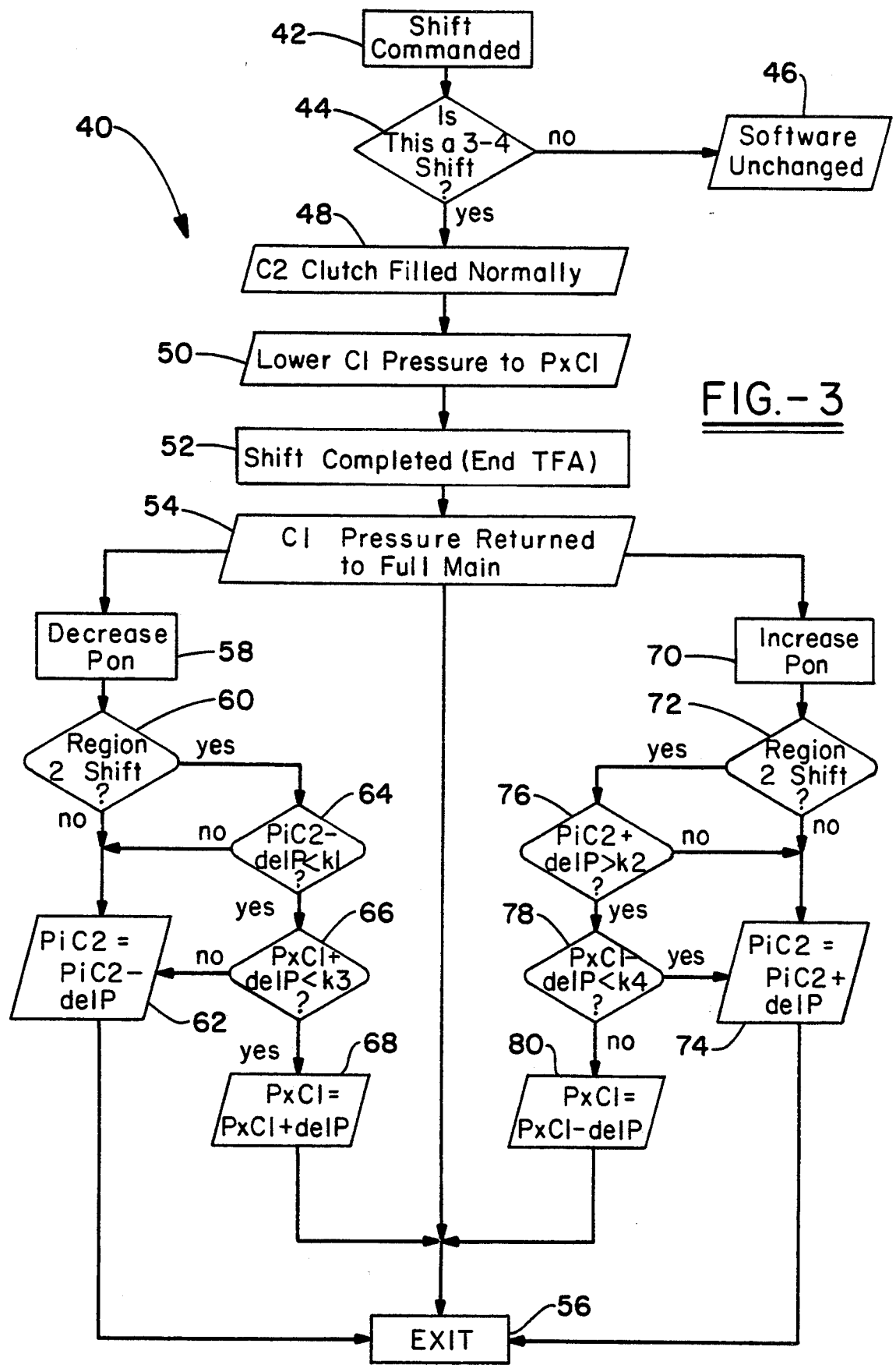
FIG. 3 is a flow chart demonstrating the method of control of the electronic control unit of the invention during the shifting of the transmission of FIG. 1.

Referring now to FIG. 3, the shift process for increased clutch capacity, as the same as controlled by the electronic control unit 20, may be seen as designated generally by the numeral 40. In the practice of the invention, the process 40 is engaged when a shift is commanded as at 42. A decision is made at 44 as to whether the shift is in the 3-4 range, the only range requiring engagement of clutch C2 while clutch C1 is already engaged. If the shift is not in the 3-4 range, the shift software remains unchanged as at 46. If, however, a 3-4 shift is requested, the C2 clutch is filled in normal fashion at 458 while the C1 pressure is lowered at 50 to a predetermined level P×C1. When a determination is made that the shift has been completed as at 52, the pressure applied to C1 is returned to the full main pressure of the supply 22, in normal fashion. At this point, the modification and control of the clutches C1, C2 in accordance with the invention has been achieved and the electronic control unit 20 may exit the program 40 as at 56.

Also provided as a portion of the concept of the invention is a process for providing an adaptive feature to the clutch capacity control technique presented above. This adaptive portion of the process determines whether the length of the 3-4 shift has fallen within an acceptable window of time. In other words, a determination is made as to whether the shift was too quick or too slow. In the event of a short shift, or one occurring too quickly, the oncoming clutch pressure is decreased as at 58. Such an approach is taken since a short shift generally results from excessive on-coming pressure. This modification of pressure is achieved by first determining as at 60 whether the engine is operating at full throttle (or approximately 90 percent thereof) such that maximum clutch capacity can be obtained. If the engine is not operating at that level, then oncoming clutch pressure to the C2 clutch is reduced by an incremental amount delP as at 62, this decrease in pressure being obtained by control of the solenoid valve 26 through the pulse width modulator 34 as regulated by the electronic control unit 20. The process 40 is then terminated at 56.

If the engine operation as determined at 60 is within the full throttle range, a determination is then made at 64 as to whether the C2 clutch pressure PiC2, as reduced by delP, is less than a set level k1 as at 64. In other words, a determination is made as to whether the C2 pressure at the shift was below a particular level. If not, then the process at 62 of reducing the oncoming C2 clutch pressure is engaged and the program terminated at 56. If, however, the oncoming C2 clutch pressure PiC2, reduced by delP, is less than the threshold k1, then a determination is made at 66 as to whether the reduced level of C1 pressure $P \times C1$, as increased incrementally by delP, is less than another threshold k3. If not, then the incremental reduction of PiC2 at 62 is engaged and the process terminated at 56. If, however, the reduced level of C1 pressure $P \times C1$, as incrementally increased by delP, is less than the threshold k3, then the modified C1 pressure $P \times C1$ is increased incrementally by delP as at 68, and the process is terminated at 56. It will, of course, be appreciated that the processing steps 64, 66, 68, undertaken only if the engine is operating at the full throttle range, establish an acceptable relationship between the oncoming C2 pressure and the existing C1 pressure during the 3-4 range shift when a short shift was experienced.

If it was found that the 3-4 range shift took a longer period of time than desired, then the process is engaged at 70 to increase the oncoming pressure of the C2 clutch. Again, a determination is made at 72 as to whether the engine is operating in the full throttle range. If not, the oncoming C2 pressure PiC2 is increased by the incremental amount delP at 74 and the process is terminated at 56. If, however, the engine was operating in the full throttle range, then relative comparisons between the oncoming C2 pressure PiC2 and the existing C1 pressure $P \times C1$ is made and adjustments engaged. At 76, a determination is made as to whether PiC2, as increased incrementally by delP is greater than the threshold k2. If the determination is made at 76 that such is not the case, then the oncoming C2 pressure is increased at 74 as just discussed. If, however, the threshold k2 is exceeded as at 76, then a determination is made at 78 as to the reduced value of the C1 pressure $P \times C1$. If that pressure, reduced by an incremental amount delP is less than a threshold k4, then the modification of oncoming C2 pressure at 74 is engaged and the process terminated at 56. However, if it is found that the modified C1 pressure is greater than the threshold k4 as discussed above, then the modified operating pressure of C1 is adjusted at 80 by incrementally reducing it by the amount delP. The process is then terminated as at 56.

It should now be appreciated that if a long shift is engaged and the engine is operating at less than the full throttle range, the oncoming C2 pressure is simply incremented by a fixed amount delP as at 74. If, however, the engine is operating at the full throttle range, then relative comparisons are made of the oncoming pressure of the clutch C2 and the existing pressure of the clutch C1 and appropriate adjustments made. In other words, if it is found that PiC2 is greater than a first threshold while $P \times C1$ is less than another threshold, then PiC2 is incrementally increased. However, if it was found that the oncoming C2 pressure was greater than the first threshold and the modified C1 pressure was greater than the other threshold, then the modified C1 pressure would be reduced.

Those skilled in the art will readily appreciate that the adaptive feature of the process 40 assures that the shift in the 3-4 range, requiring actuation of the C2 clutch while the C1 clutch is engaged, is completed within a particular window of time, being less than a greater threshold, and more than a lesser threshold.

Those skilled in the art will readily appreciate that the modification of the various C1 and C2 pressures are achieved under control of the electronic control unit 20 through the pulse width modulator 34 which operates the solenoid control valves 24-32 at adjustable duty cycles to regulate the pressure.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is.

1. An automatic transmission for a vehicle, comprising:
   a plurality of clutches, including at least a pair of first and second of such clutches being nested together; and
   means interconnecting said plurality of clutches for engaging and disengaging selected ones of said clutches to attain desired transmission ranges, said means reducing a pressure to said first clutch to keep said first clutch engaged while applying a pressure to said second clutch to attain engagement of said second clutch while said first clutch is engaged.

2. In an automatic transmission for a vehicle having a plurality of clutches adapted for selective engagement to achieve transmission operation in selected ranges, and wherein at least a pair of first and second of such clutches are nested together, the improvement of a clutch control mechanism, comprising:
   electronic control means interconnecting said clutches for reducing a pressure on said first clutch to a first level and applying a pressure to said second clutch at a second level when said second clutch is being engaged while said first clutch is already engaged to achieve a transmission shift and further monitoring a period of time to complete said shift and thence adjusting said first and second levels to attain said shift between upper and lower thresholds of time.

3. An automatic transmission for vehicles, comprising:
   a plurality of clutches;

first and second clutches of said plurality of clutches being nested together such that a force available to engage said second clutch is restricted by a present engagement of said first clutch; and control means interconnecting said clutches for controlling the engagement thereof to attain selected transmission ranges, said control means reducing a force applied to said first clutch to a first level to keep said first clutch engaged while applying a force of a second level to said second clutch to attain engagement of said second clutch to attain a transmission shift, and thence increasing said forces applied to said first and second clutches following engagement of said second clutch, said control means further monitoring a period of time to complete said transmission shift and modifying said first and second levels to attain said transmission shift within fixed limits of time.

* * * * *